(12) United States Patent
Greenberg

(10) Patent No.: US 9,306,379 B2
(45) Date of Patent: Apr. 5, 2016

(54) FUSE AND POWER DISTRIBUTION BLOCK

(71) Applicant: William Greenberg, Windham, OH (US)

(72) Inventor: William Greenberg, Windham, OH (US)

(*) Notice: Subject to any disclaimer, the term of this patent is extended or adjusted under 35 U.S.C. 154(b) by 0 days.

(21) Appl. No.: 14/157,365

(22) Filed: Jan. 16, 2014

(65) Prior Publication Data

US 2014/0305693 A1    Oct. 16, 2014

Related U.S. Application Data

(60) Provisional application No. 61/753,401, filed on Jan. 16, 2013.

(51) Int. Cl.
*H01R 9/24* (2006.01)
*H02G 3/08* (2006.01)
*H01H 85/20* (2006.01)

(52) U.S. Cl.
CPC ........... *H02G 3/08* (2013.01); *H01H 2085/208* (2013.01); *H01R 9/245* (2013.01)

(58) Field of Classification Search
CPC ....................................................... H01R 9/245
USPC ........................................................ 174/520
See application file for complete search history.

(56) References Cited

U.S. PATENT DOCUMENTS

| | | | | |
|---|---|---|---|---|
| D264,460 S | 5/1982 | Moller | | |
| 5,167,541 A * | 12/1992 | Alves | ...................... | H01H 85/20 337/186 |
| 5,328,392 A * | 7/1994 | Lin | ...................... | H01H 85/203 439/620.27 |
| D370,662 S | 6/1996 | Alfaro | | |
| 5,551,894 A * | 9/1996 | Lin | ......... | H01R 9/245 439/620.27 |
| 5,618,209 A * | 4/1997 | Lin | ...................... | H01H 85/205 439/620.26 |
| D406,111 S | 2/1999 | Awbrey | | |
| D425,870 S | 5/2000 | Torrez | | |
| D430,850 S | 9/2000 | Alves et al. | | |
| D442,148 S | 5/2001 | Renne et al. | | |
| 6,551,141 B2 * | 4/2003 | Liang | ................. | H01H 85/2035 439/620.27 |
| 6,753,754 B1 * | 6/2004 | Black | ................... | H01H 85/205 337/187 |
| D508,027 S | 8/2005 | Shingt | | |
| 7,118,400 B1 * | 10/2006 | Lopez | .................. | H01R 9/2441 439/170 |
| 7,223,129 B1 * | 5/2007 | Lopez | ...................... | H01R 9/24 174/59 |
| D582,848 S | 12/2008 | Johansson | | |
| D598,858 S | 8/2009 | Stromiedel et al. | | |
| D625,270 S | 10/2010 | Schafmeister | | |
| 7,942,706 B1 | 5/2011 | McSweyn et al. | | |
| D652,797 S | 1/2012 | Smith et al. | | |
| D671,897 S | 12/2012 | Kettern et al. | | |
| 2003/0003807 A1 * | 1/2003 | Beer | ...................... | H01H 9/085 439/620.26 |
| 2005/0090154 A1 * | 4/2005 | Ikeda | ...................... | H01R 9/245 439/709 |
| 2007/0139842 A1 * | 6/2007 | De' Longhi | ........... | H01R 13/68 361/103 |
| 2008/0020647 A1 * | 1/2008 | Carter | ................... | H01H 85/20 439/620.27 |
| 2014/0020947 A1 * | 1/2014 | Richardson et al. | .......... | 174/520 |

* cited by examiner

*Primary Examiner* — Hung V Ngo

(57) ABSTRACT

A fuse and power distribution block is provided which includes a polymer base, and multiple conductive base blocks for connection with incoming power lines or outgoing accessory lines. Each conductive base block also provides multiple alternative fuse connections on a first upper horizontal platform, a second lower horizontal platform, and a third intermediate vertical platform interconnecting the first and second platforms. The fuse and power distribution block may, depending on the desired accessory system, include 4 or 6 conductive base blocks. The fuse and power distribution block has an attractive transparent polymer cover and shell.

4 Claims, 8 Drawing Sheets

FUSE AND POWER DISTRIBUTION BLOCK

CROSS-REFERENCE TO RELATED APPLICATIONS

The present application claims priority from, and incorporates herein by reference, the subject matter of U.S. Application Ser. No. 61/753,401 filed Jan. 16, 2013.

FIELD OF INVENTION

The present application relates to a fuse and power distribution block for use in connection with electrical connection and circuit design and specifically, for a customizable fuse and power distribution block of the type commonly used in vehicle and recreational vehicle applications, where modification of fuse protection and power circuitry is desirable in order to accommodate a variety of equipment applications with high power requirements.

BACKGROUND

Most automobiles have two fuse panels. The fuse panel in the engine compartment typically contains the fuses for protection of the electrical circuits associated with vehicle functions such as cooling fans, anti-lock brakes, and engine control units. An interior fuse panel, usually located under the dash on the driver's side, protects electrical circuits associated with electrical devices inside the passenger compartment. Different fuse designs have different rating ranges. For example, AGU fuses (the glass cylinder type) are commercially available with ratings between 5 and 60 amps. MAXI fuses (blade type) are commercially available with ratings between 40 and 100 amps. The more expensive ANL (automatic noise limiting) fuses (wafer type) are commercially available with ratings between 60 and 300 amps, and are generally provided as power wire inline battery fuses. For even larger loads, circuit breakers may be required.

Improvements in electronics have also increased the development and availability of high technology accessories for vehicles and recreational vehicles, such as CD players, DVD players, televisions, computers, high powered amplifiers, various stereo system components, and other appliances configured to operate at low voltages. The number of custom options available far exceeds the availability, capacity, and design of the original vehicle equipment or the factory supplied electric circuits.

Frequently, the load requirement of a vehicle accessory exceeds the highest rated fuse that can fit in a factory supplied fuse panel. For example, many stereo amplifiers are rated at 2,000 or even 3,000 watts. 150 amp fuses are required for such an accessory. As a result, a separate fuse box, block or panel must generally be purchased for the custom accessory, which block must accommodate the larger amp fuses.

The available space for such fuse blocks is limited, not to mention the further disadvantage that the custom electrical devices may also have significantly different load requirements, meaning different—higher or lower—current circuits with corresponding fuse ratings, may also be required, necessitating the purchase of more than one additional fuse block or panel. As a result of these custom design criteria, two or three different power distribution blocks may be required to accommodate different fuse designs, as well as the different sizes of AWG gage input wires.

The large custom automobile market has also created a special demand for additional power distribution and high current load capable circuits. Multiple amplifiers in a custom audio system require maximum power for peak performance. Safely moving power from a vehicle battery to the amplifiers requires high performance power distribution and specific fuse capability. These applications require solutions that not only satisfy the electrical system functionality requirements and protect the expensive accessories, but the solutions are desired to be cosmetically enhancing. For example, the custom automobile industry may use fancy or stylish fuses (gold plated), and highly decorative architecture for the fuse panel.

SUMMARY

This application provides a distribution block which is a combination of adjustable power distribution circuitry and customizable fuse configuration in an attractive and efficient design to safely power multiple amplifiers or custom entertainment and/or audio system accessories. It is well understood by automotive audio system experts, that if you desire a high performance system which retains the quality of the sound, then amplifiers are required. Amplifiers provide better sound quality by driving the system speakers. Original equipment vehicle amplifiers built into the in-dash stereo have limited capabilities. Installing an external power amplifier, or amp, will provide cleaner sound and sound which is more defined at the highest volume levels. An amp will also supply needed power to any upgraded system speakers. A separate amplifier is also required for any system subwoofers which are installed, since subwoofers require much more power than original equipment in-dash receivers provide. Depending on the desired features of the customized audio system, numerous combinations of components may be involved. For example, a mono amplifier may be used for powering a subwoofer. A 2 or 4 channel amp may be used for some component speaker systems or for full range speakers, while a 4, 5, or 6-channel amp is needed to handle a combination of subwoofers and full range speakers.

In the present application, a fuse and power distribution block is provided to enable adjustable power distribution circuitry and customizable fuse configurations. The device includes a transparent polycarbonate protective cover supporting a polycarbonate ribbed shell, all located on a polycarbonate base. The heat and impact-resistant base, shell and cover help protect the fuses and connections further supported on the base, once the block is installed in the vehicle, for example, within a vehicle engine compartment. The cover and shell are provided with locking tabs which snap into secure engagement with openings formed in the base to complete the installation. The shell is used over the cover, and while not required, it provides additional support to the cover, protection of the fuses and an enhanced appearance for the device.

The present distribution block provides both an attractive and efficient use of space. The base is provided with numerous mounting holes for adjustability when mounting the fuse and power distribution block in the vehicle. Secured to the base are metal, for example brass or zinc or other appropriate metal, plates or base blocks. Six base blocks are provided in the illustrated embodiment, with three base blocks on one side of the base having openings for input power connectors on an external surface for receiving a power line, and three base blocks on an opposite side of the base have openings for outlet line connectors on an external surface for interconnection with accessory devices or ground wires. Each of the base blocks is secured to the base with conventional fasteners, and has 3 platforms for fuse interconnection: an upper horizontal platform, a lower horizontal platform, and a vertical platform intermediate the upper and lower platforms. Fuses are also connected by conventional fasteners. Specifically, the metal base corner blocks each have a single fuse connection on the upper and vertical platforms, and 2 fuse connections on the lower platform. The center metal base blocks, between the corners, have 2 fuse connections on each of the 3 platforms. The use of numerous fuse connections on each metal base block makes a variety of multiple Mini-ANL or AFS fuse connections and configurations possible for customized applications buss bars, or fuses of up to about 300 amps. These smaller Mini-ANL fuses are rated from 20 A to 150 A, though some larger sizes are available. By having multiple platforms for these smaller fuses, the present invention expands the potential of the Mini-ANL fuses to accommodate loads up to 300 A. Numerous input and output power connectors may also be provided to accept a variety of AWG gauge cables, such as 4 to 1/0 gauge or 8 to 4 gauge. Connection to additional distribution blocks is also possible.

DETAILED DRAWING DESCRIPTIONS

Figure 15:
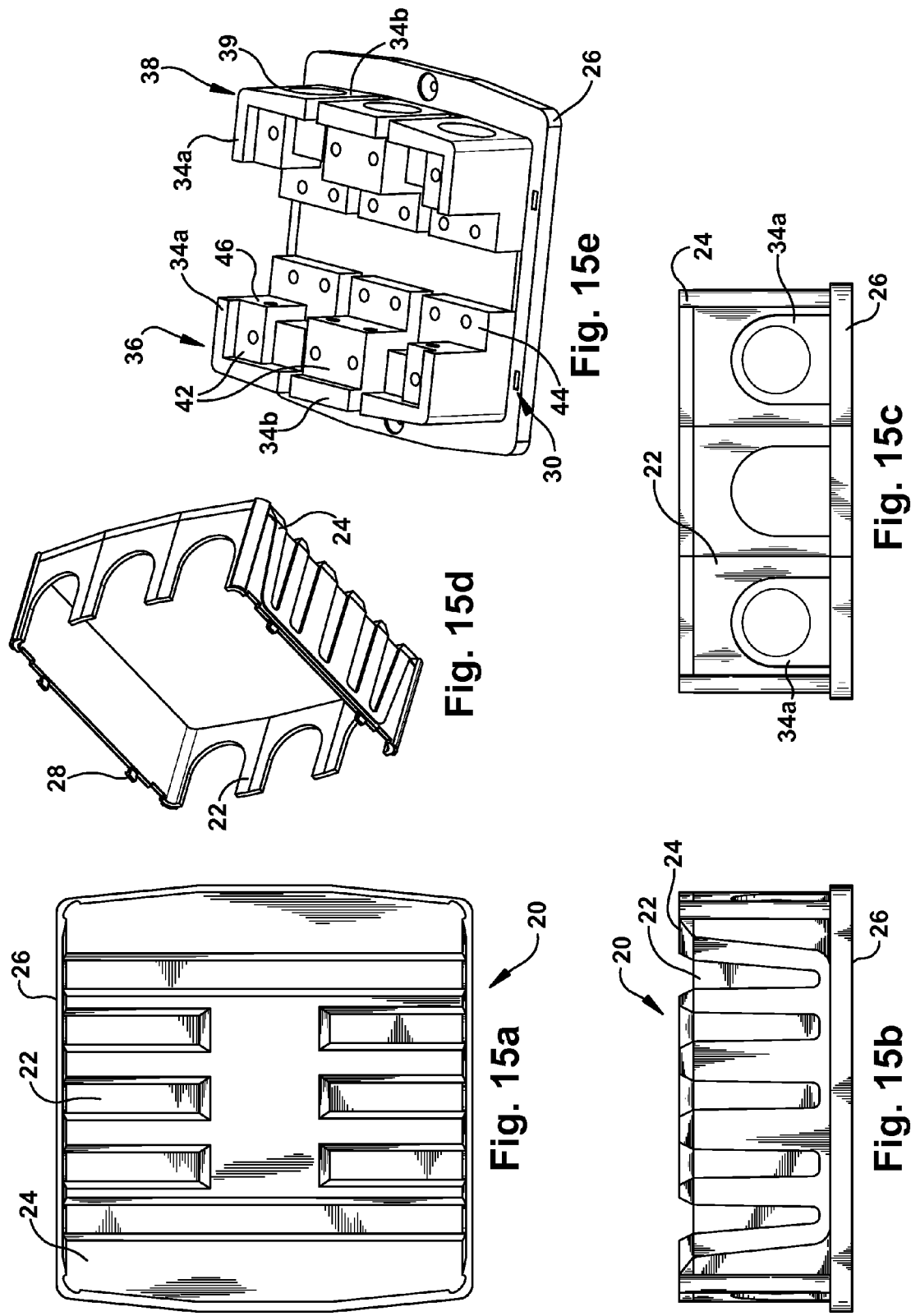

FIG. 15$a$ is a top view of the fuse and power distribution block.

FIG. 15$b$ is a side view of the block of FIG. 15$a$.

FIG. 15$c$ is an end view of the block of FIG. 15$a$.

FIG. 15$d$ is a bottom perspective view of the cover and ribbed shell removed from the base.

FIG. 15$e$ is a partial view of the base and conductive base blocks with the cover removed.

Figure 16:
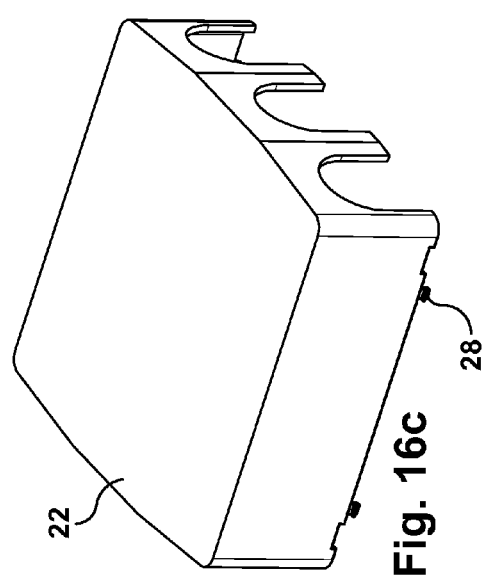
Figure 16C:
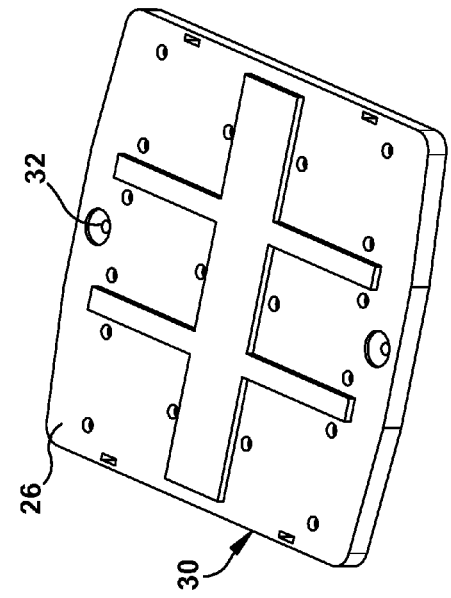
Figure 16A:
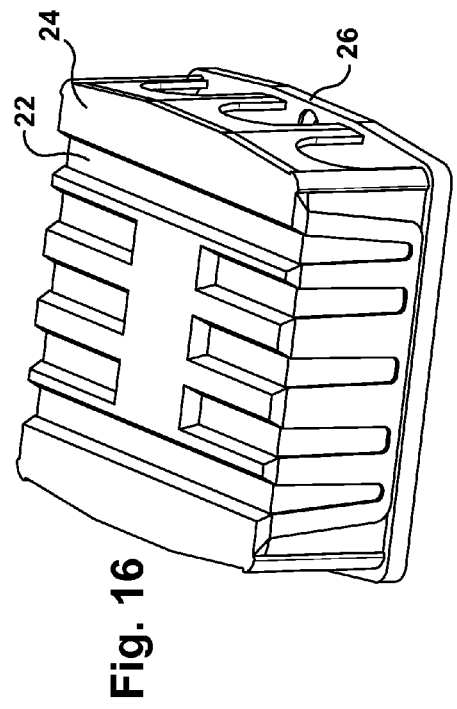
Figure 16B:
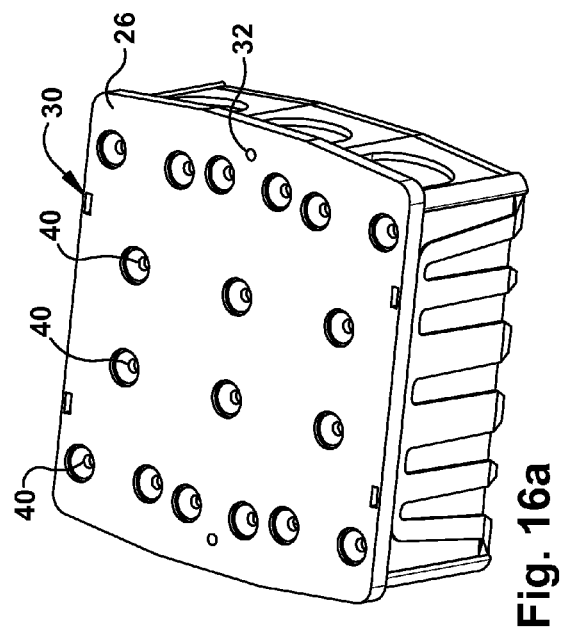

FIG. 16 is a perspective view of the device of FIG. 15.

FIG. 16$a$ is a bottom perspective view of the device of FIG. 16.

FIG. 16$b$ is a top perspective view of the base of the device of FIG. 15$e$, with the conductive base blocks removed.

FIG. 16$c$ is a top perspective view of the cover without the ribbed shell.

DETAILED DESCRIPTION

A distribution block 20 is shown in FIGS. 1 to 16$c$, which enables a combination of adjustable power distribution circuitry and customizable fuse configuration in an attractive and efficient design intended and suitable for low voltage power distribution systems as defined, for example, by SAE specification J1127 or J1128, and wherein the operating voltage is specified as a nominal system voltage of 60 V DC (25 V AC) or less in surface vehicle electrical systems. Such a system has many applications, such as safely powering multiple amplifiers or custom entertainment and/or audio system accessories A. In the present application, the fuse and power distribution block 20 includes a transparent polycarbonate protective cover 22 supporting a polycarbonate ribbed shell 24, all located on a polycarbonate base 26. The heat and impact-resistant base 26, shell 24 and cover 22 help protect the fuses F and connections C further supported on the base, once the block 20 is installed in the vehicle, for example, within a vehicle engine compartment. The cover 22 and shell 24 are provided with locking tabs 28 which snap into secure engagement with openings 30 formed in the base 26 to complete the installation. The shell 24 is used over the cover 22, and while not required, it provides additional support to the cover, protection of the fuses F and an enhanced appearance for the device.

Figure 1:
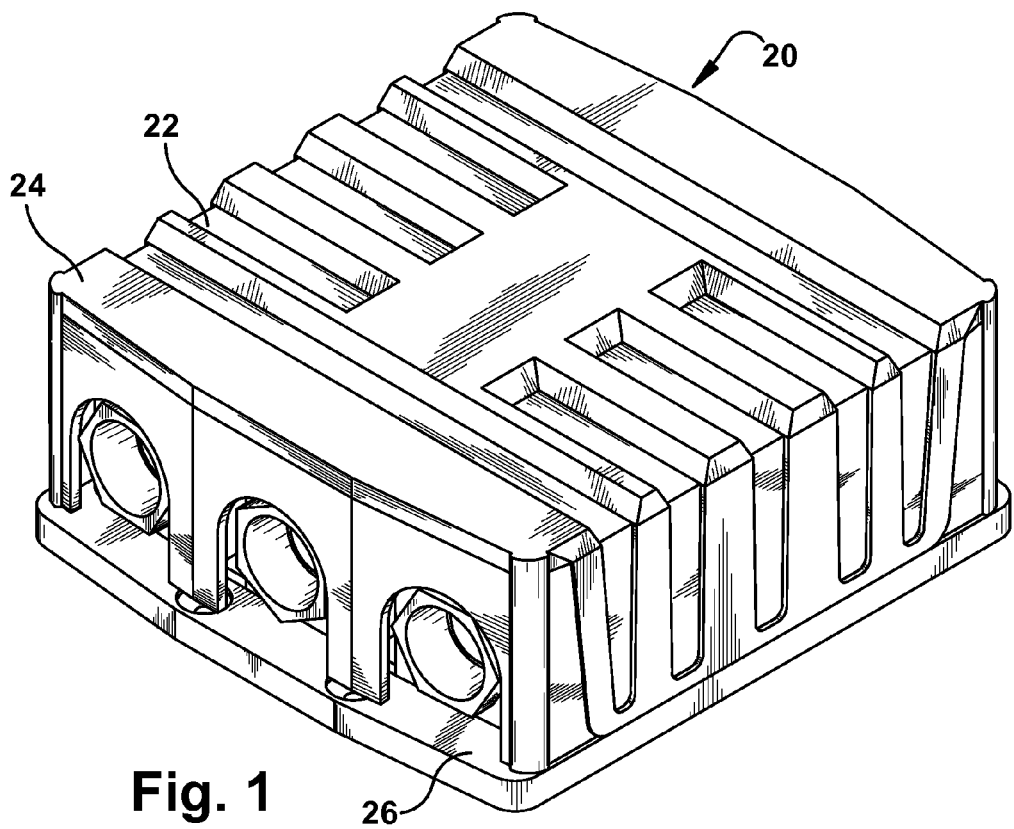
FIG. 1 is a perspective view of the fuse and distribution block of the present application.
Figure 2:
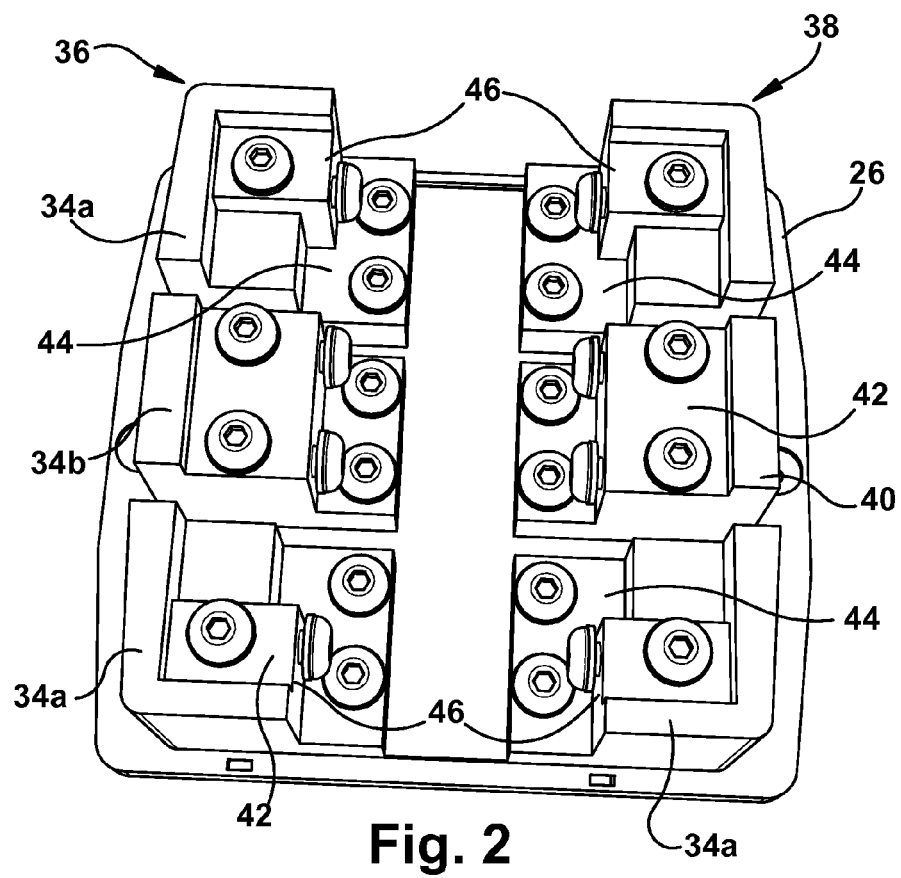
FIG. 2 is a top view of the fuse and distribution block of FIG. 1 with the cover removed, and showing one Mini-ANL fuse positioned for connection to the block by conventional fasteners or solder material.
Figure 3:
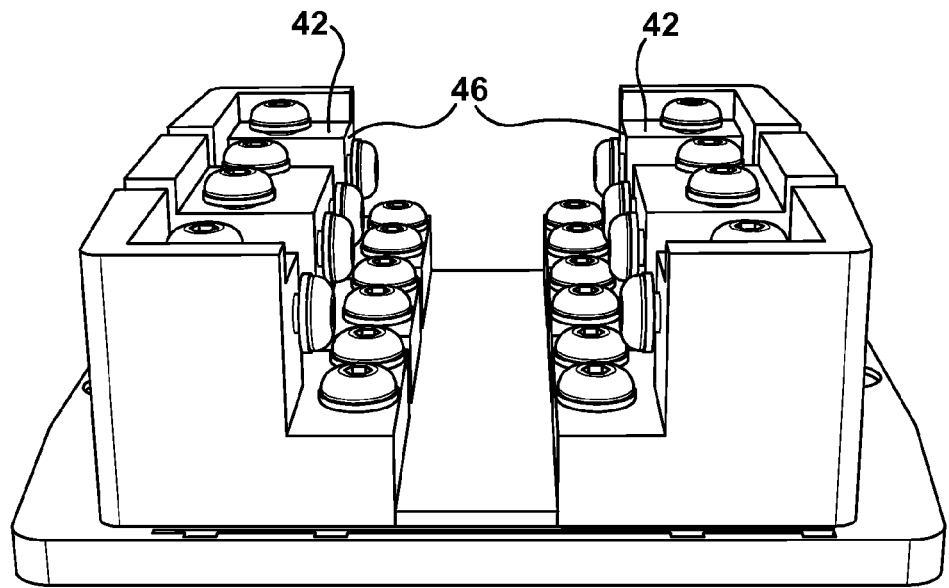
FIG. 3 is an end view of the fuse and distribution block of FIG. 2.
Figure 4:
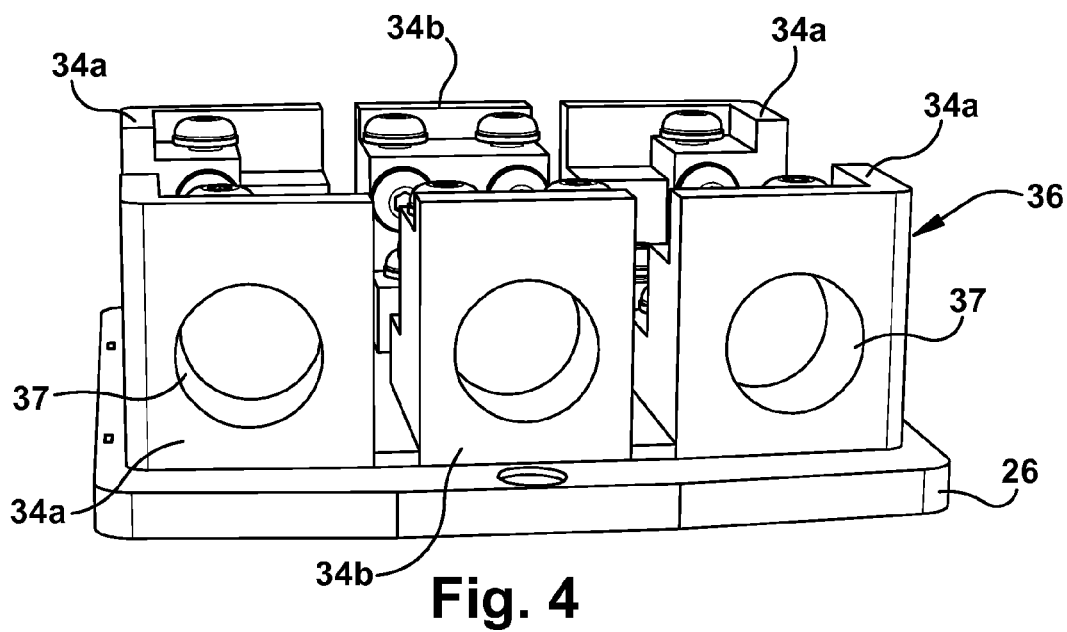
FIG. 4 is a side view of the fuse and distribution block of FIG. 2, showing one of the 3 power connectors removed from the block, and the vertical platform on the metal base blocks for fuse interconnection.

The distribution block 20 provides both an attractive and efficient use of space, as shown in the attached FIGS. 1 and 15$a$ to 16$c$. The base 26 is provided with numerous mounting holes 32 for adjustability when mounting the fuse and power distribution block 20 in the vehicle. Secured to the base are metal, for example brass or zinc or other appropriate metal, plates or base blocks 34. Six base blocks 34 are provided in the illustrated embodiments, with three base blocks on one side 36 of the base having openings 37 for line connectors IC on an external surface, for example, receiving input lines, ground distribution, outlet lines or a power line IL, and three base blocks on an opposite side 38 of the base have openings 39 for line connectors OC on an external surface, for example, for input lines, power lines or outlet lines for interconnection OL with accessory devices A, batteries P or other ground wires G. The openings for connectors IC, OC are shown in FIG. 4 with the connectors removed from the blocks 34. Each of the base blocks 34 is secured to the base 26 with conventional fasteners through openings 40 in the base, and has 3 platforms for fuse F interconnection: an upper horizontal platform 42, a lower horizontal platform 44, and a vertical platform 46 intermediate the upper and lower platforms. As shown in FIG. 2, a Mini-ANL fuse F is secured on the vertical platform 46 of the central blocks 34$b$ and connected to the block by conventional fasteners or solder material. Specifically, the metal base corner blocks 34$a$ each have a single connection location on the upper horizontal and vertical platforms 42, 46, and 2 connection locations on the lower horizontal platform 44. The center metal base blocks 34$b$, between the corner blocks 34$a$, have 2 connections locations 50 on each of the 3 platforms.

Figure 5:
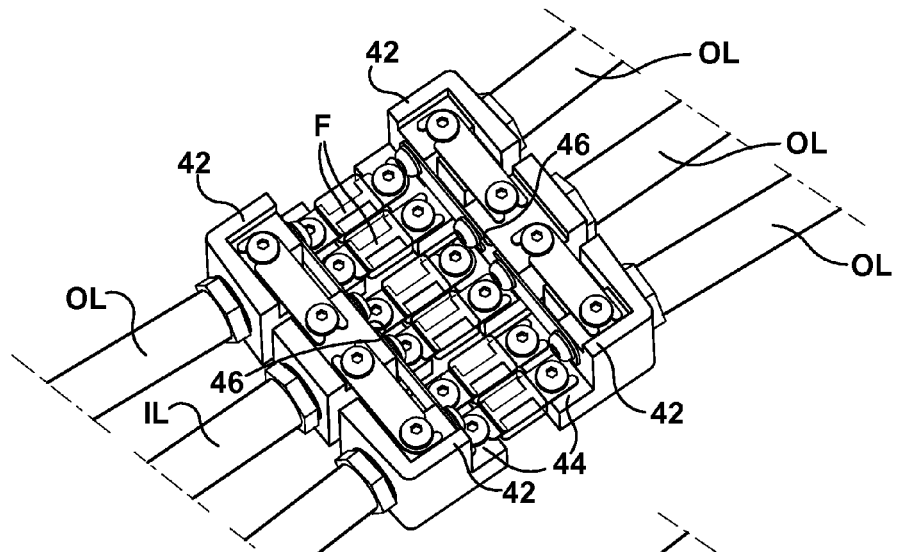
FIGS. 5-9 are schematic representational views of the various alternate incoming, fuse and outgoing connections possible using the fuse and distribution block of the present application.
Figure 6:
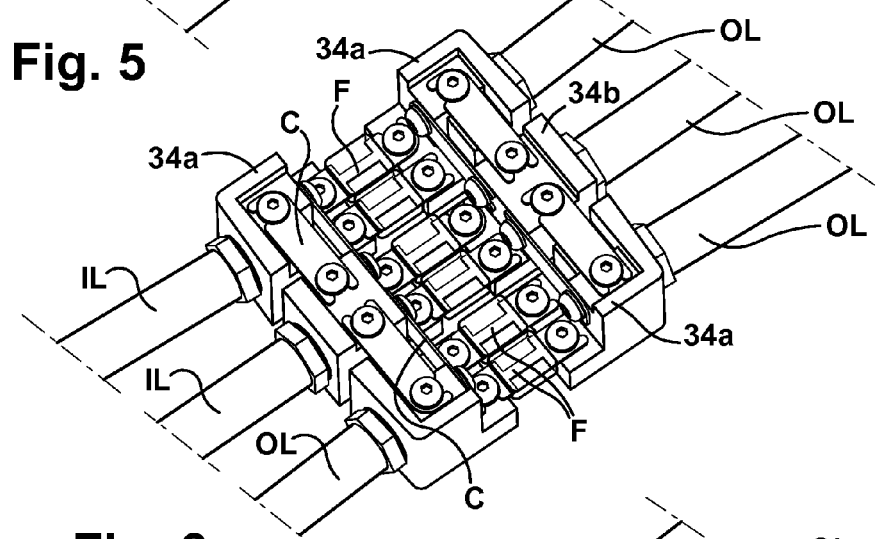
Figure 7:
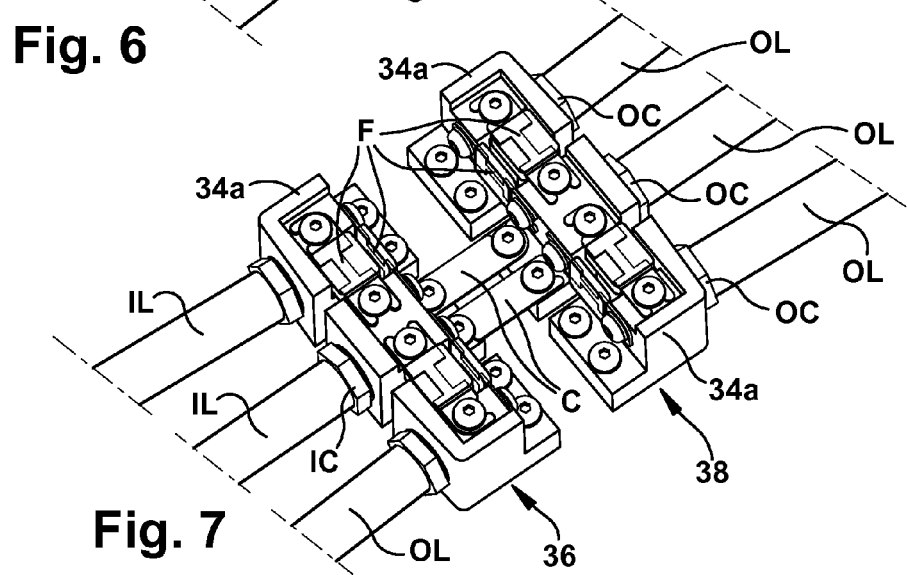
Figure 8:
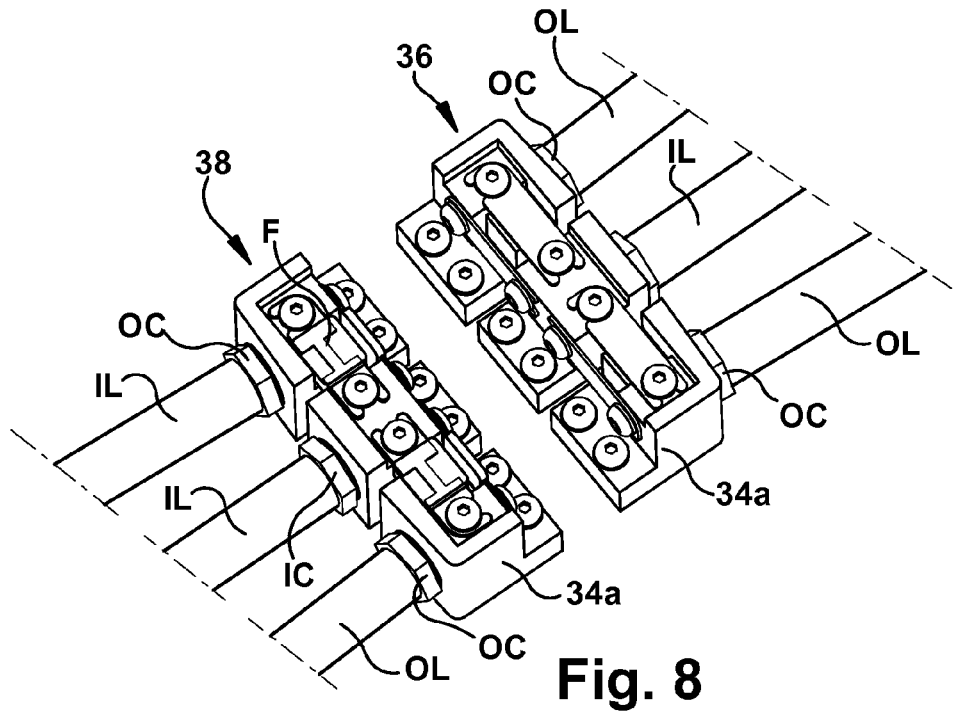
Figure 9:
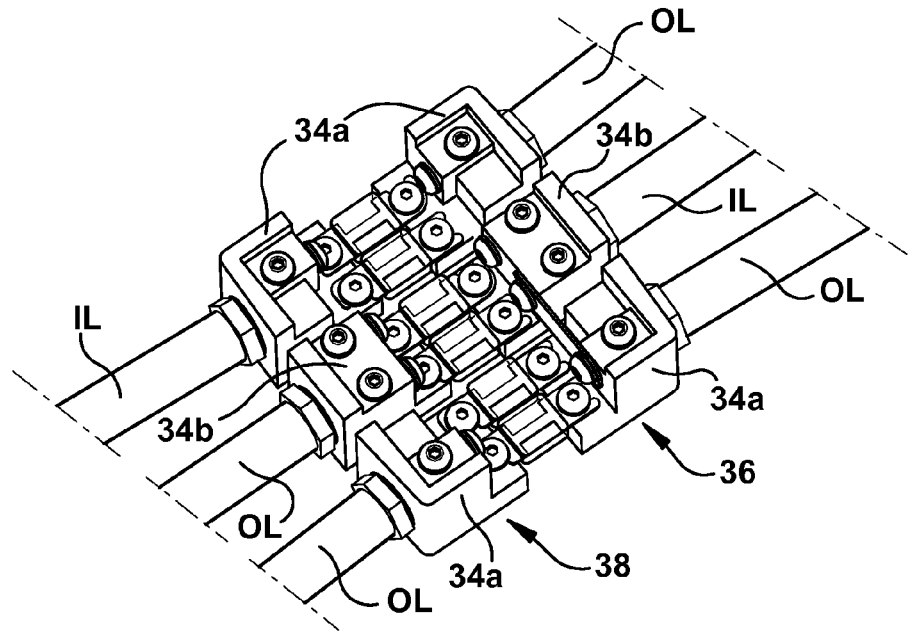
Figure 10:
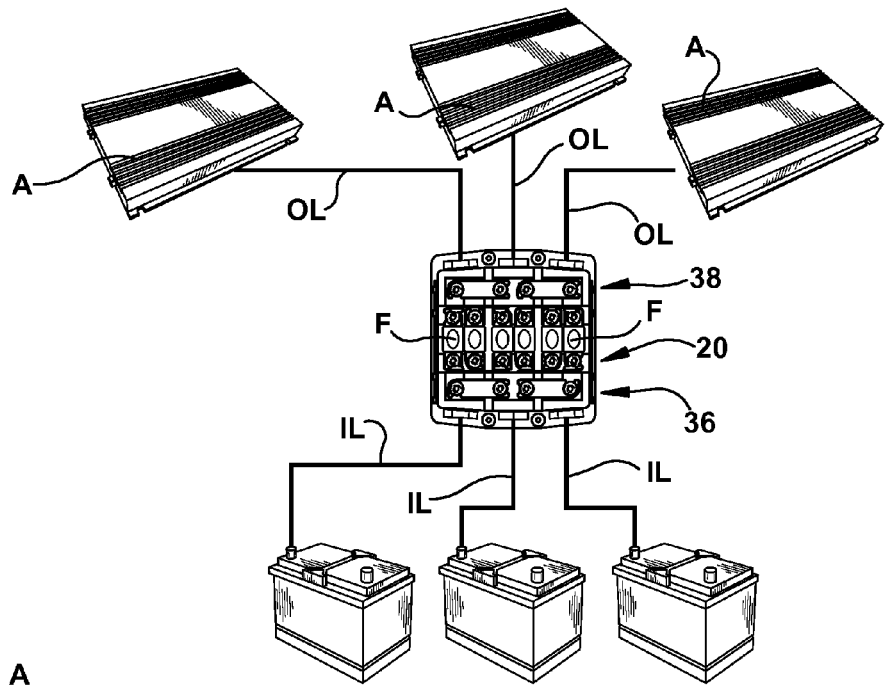
FIGS. 10-14 are schematic representational views of various connections to a battery or batteries and additional entertainment accessory devices, such as amplifiers, speakers and tuners, together with possible fuse configuration connections for such power and accessory devices.
Figure 11:
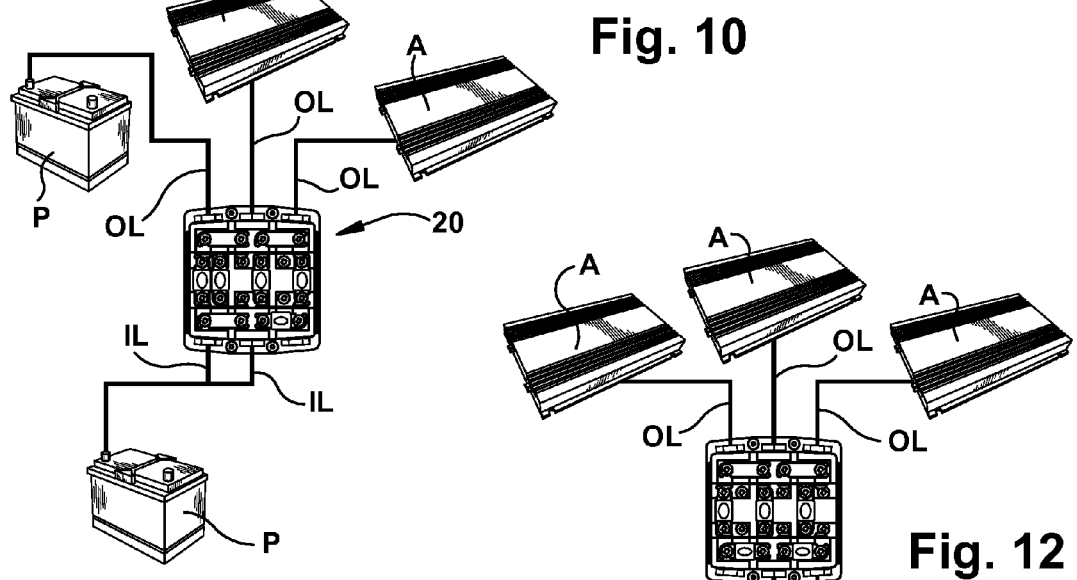
Figure 12:
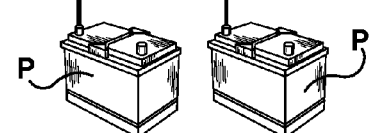
Figure 13:
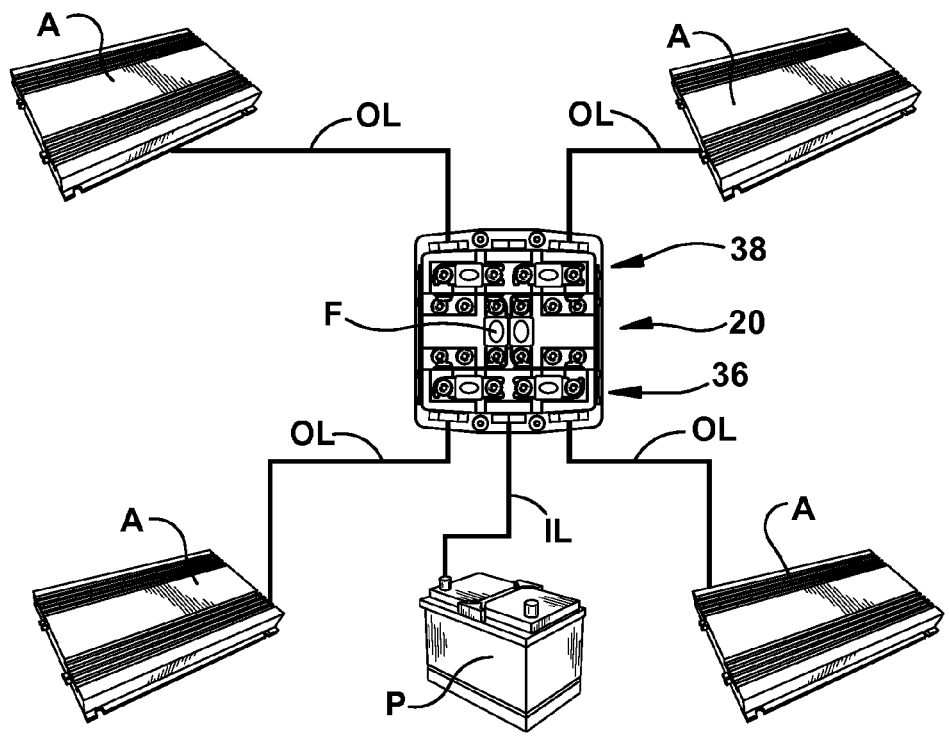
Figure 14:
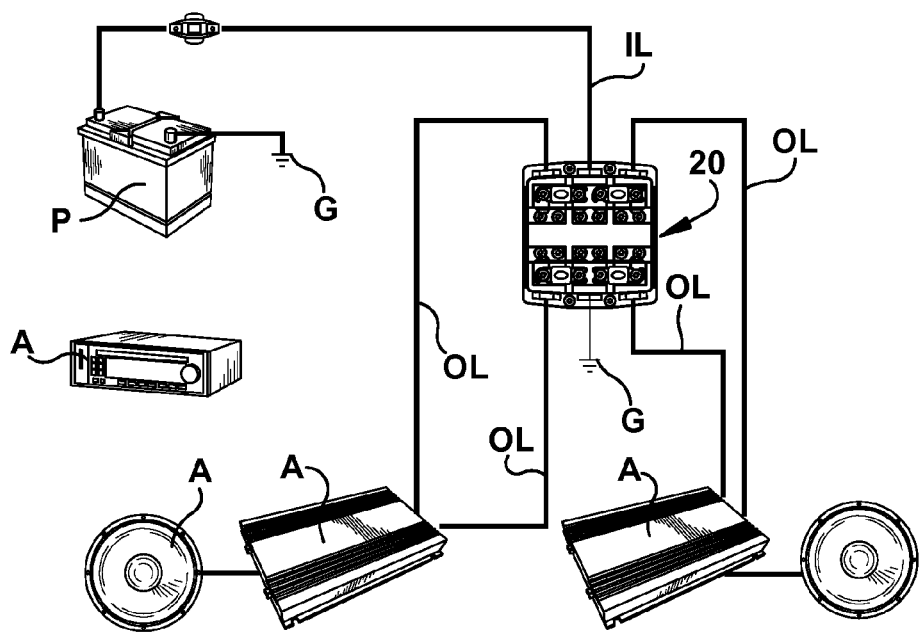

FIG. 5 shows 2 fuses F connected on the lower horizontal platforms 44, one fuse being located between each of the opposing blocks 34 on the one base side 36 and the opposite base side 38. In FIG. 6, 2 additional connections C are shown on the vertical platforms 46 of the blocks 34 on the one base side 36, where each corner block 34$a$ is connected to the central block 34$b$, and also on the corresponding upper horizontal platforms 42. As shown in FIG. 7, fuses F are shown interconnecting each corner block 34$a$ to its adjacent central block 34$b$ on both the upper horizontal platform 42 and the lower horizontal platform 44, and the central bocks 34$b$ are also interconnected at C on their lower horizontal platforms 44. In FIG. 8, the 2 sides of the base 36, 38 are not interconnected. Instead, fuses F are shown interconnecting each corner block 34$a$ to its adjacent central block 34$b$ on both the upper horizontal platform 42 and the lower horizontal platform 44 on the one base side 36. On the opposite base side 38, connections C are provided to interconnect each corner block 34$a$ to its adjacent central block 34$b$ on both the upper horizontal platform 42 and the vertical platform 46. Finally, in FIG. 9, 6 fuses F are shown interconnecting each of the corner blocks 34a and central block 34b on the one side 36 with the opposite blocks 34a, 34b on the opposite side 38, along with connections C on one corner block 34a to its adjacent central block 34b on both the upper horizontal platform 42 and the vertical platform 46. It should be noted that the additional vertical platform 46 allows for the same capacity laterally as the dual link configuration which is provided for opposing conductive blocks at on the lower horizontal platform 44, versus using the upper horizontal platform 42 alone.

The use of numerous fuse connections on each metal base block 34 makes a variety of multiple Mini-ANL or AFS fuse connections and configurations possible for customized applications buss bars, or fuses of up to about 300 amps. As shown in FIGS. 10-14, the present device enables the use of various combinations of connections to a battery or batteries P and additional entertainment accessory devices A, such as amplifiers, speakers and tuners, together with possible fuse configuration connections for such power and accessory devices.

These smaller Mini-ANL fuses are rated from 20 A to 150 A, though some larger sizes are available. By having multiple platforms 42, 44, 46 for these smaller fuses, the present device 20 expands the potential of the Mini-ANL fuses to accommodate loads up to 300 A. Numerous input P and output O power connectors may also be provided to accept a variety of AWG gauge cables, such as 4 to 1/0 gauge or 8 to 4 gauge. Connection to additional distribution blocks 20 is also possible.

Although the fuse and distribution block of the present application has been described in detail sufficient for one of ordinary skill in the art to practice the invention, it should be understood that various changes, substitutions and alterations may be made without departing from the spirit or scope of the device as defined in the attached claims. Moreover, the scope of the present device is not intended to be limited to the specific embodiments described here, which are provided by way of example. As one of ordinary skill in the art will readily appreciate from the disclosure of the present device and its embodiments, other components and means presently existing or later to be developed that perform substantially the same function to achieve substantially the same result as those of the corresponding embodiments described here, may be utilized according to the present application. Accordingly, the appended claims are intended to include within their scope such other components or means.

I claim:

1. A fuse and power distribution block having a polymer base, the polymer base supporting no more than six conductive blocks, where three conductive blocks are positioned on a first side of the polymer base, and three conductive blocks are positioned on a second side of the polymer base opposite the first side, such that each conductive block has an adjacent conductive block on the same side of the polymer base and on the opposite side of the polymer base, and the conductive blocks are for connection with incoming power lines, ground distribution or outgoing accessory lines, with each conductive block also providing multiple alternative fuse connections, and each of the conductive blocks consisting of a first upper horizontal platform providing optional electrical interconnection with a first upper horizontal platform of an adjacent conductive block, a second lower horizontal platform providing optional electrical interconnection with a second lower horizontal platform of an adjacent conductive block, and a third intermediate vertical platform interconnecting the first and second horizontal platforms of each conductive block and providing optional electrical interconnection with a third intermediate vertical platform of an adjacent conductive block.

2. The fuse and power distribution block of claim 1, wherein 4 of the conductive blocks are provided at corners of the base.

3. The fuse and power distribution block of claim 1 having a transparent polymer cover.

4. The fuse and power distribution block of claim 3 having a ribbed polymer shell also covering the block and cover.

* * * * *